US005338344A

United States Patent [19]

Bondurant

[11] Patent Number: 5,338,344

[45] Date of Patent: Aug. 16, 1994

[54] DECREASING ALCOHOL CONTENT OF FOUNTAIN SOLUTIONS FOR PLANOGRAPHIC PRINTING

[76] Inventor: Louis E. Bondurant, P.O. Box 2074, Middleburg, Va. 22117

[21] Appl. No.: 28,419

[22] Filed: Mar. 9, 1993

Related U.S. Application Data

[63] Continuation-in-part of Ser. No. 846,567, Mar. 5, 1992, Pat. No. 5,268,025.

[51] Int. Cl.[5] .......... C09K 3/18

[52] U.S. Cl. .......... 106/2; 101/451

[58] Field of Search .......... 106/2; 101/451

[56] References Cited

U.S. PATENT DOCUMENTS

| | | | |
|---|---|---|---|
| 3,398,002 | 8/1968 | Bondurant | 106/2 |
| 3,877,372 | 4/1975 | Leeds | 106/2 |
| 4,278,467 | 7/1981 | Fadner | 106/2 |
| 4,769,072 | 9/1988 | Bondurant et al. | 106/2 |
| 4,854,969 | 8/1989 | Bassemir et al. | 106/2 |
| 4,938,800 | 7/1990 | Allen | 106/2 |
| 5,203,926 | 4/1993 | Bondurant | 106/2 |

*Primary Examiner*—Helene Klemanski
*Attorney, Agent, or Firm*—Raymond N. Baker

[57] ABSTRACT

Improvements in fountain solutions which enable continued use of existing planographic printing equipment and printing materials while taking into consideration environmental concerns. Formulation methods for such fountain solutions are disclosed which provide for substantially decreasing the amount of alcohol while continuing printing operations with existing printing inks. Such transitional fountain solutions are compatible with existing types of planographic printing plates and do not require the changing of fountain solution when changing the type of printing plate to be used in a printing press. An amine, such as N-methylpyrrolodine, is selected in combination with an alcohol so as to substantially decrease the alcohol content of the fountain solution; buffers, humectants, and emulsifying and coupling agents are disclosed with percentage ranges for selection to provide for continued quality printing with existing equipment and materials.

18 Claims, No Drawings

DECREASING ALCOHOL CONTENT OF FOUNTAIN SOLUTIONS FOR PLANOGRAPHIC PRINTING

This application is a continuation-in-part of application Ser. No. 07/846,567 filed Mar. 5, 1992 now U.S. Pat. No. 5,268,025.

The present invention relates to improvements in fountain solutions which enable continued use of existing planographic printing equipment and printing materials; and, more particularly, is concerned with new fountain solutions which take into consideration factors subject to increasing environmental regulation.

Planographic printing involves continuous coaction of press roll means with a cylinder-mounted printing plate during printing operations. Metal surfaces of the fountain solution (moisturizing) system transfer fountain solution to water-receptive nonprint areas of the printing plate. An ink roller transfers ink to water-repellent ink-receptive print areas of the printing plate, and the printing plate transfers ink and moisture to the blanket cylinder for offset printing operations.

The terms "fountain solution system" and "water system" are often used synonymously. For example, metal and rubber transfer surfaces of the "fountain solution system" are for proper transfer of moisture to the water-receptive nonprint areas of the printing plate and, subsequently, to the blanket cylinder. Thus, fountain solution plays an important role in helping to avoid or solve problems associated with moisturizing functions along with compatibility of equipment and materials which help to maintain printing quality.

The moistening, inking and transfer operations are successively repeated for the production of large numbers of copies. The fountain solutions, such as those disclosed in U.S. Pat. No. 4,769,072, contain as high as 25%, by weight, of the stock solution as an alcohol having a low flash point. In addition to other factors for concern, the relatively high percentage of low flash point alcohol tends to facilitate release of vapors from other constituents, such as ethylene glycol.

A primary objective of the present invention is to diminish concerns with handling, storage and use of chemical solutions for offset printing operations while providing a fountain solution which is effective with existing printing equipment and materials.

The fountain solutions of the present invention help to delay requirements for replacement of printing equipment or printing inks which have relied on the prior fountain solutions. The invention provides transition-type solutions which do not require completely eliminating alcohol. Many print shops require a gradual changeover because certain equipment has been designed for fountain solutions with significant alcohol content. Secondly, environmental regulations of differing jurisdictions vary considerably and are subject to change in differing jurisdictions. Thirdly, there is, at present, a U.S. E.P.A. objective to use a vegetable oil, such as soybean oil, in printing ink in place of hydrocarbons from petroleum sources. As a result, a significant portion of the ink now used is "soybean ink"; and, decreasing alcohol in accordance with teachings of the present invention will be helpful in accommodating continued use of such "soybean" printing inks.

The present invention provides transition fountain solutions, compatible with existing equipment and materials, while substantially decreasing the amount of alcohol, and other materials such as ethylene glycol. Such transitional fountain solutions are compatible with existing types of planographic printing plates and do not require the fountain solution to be changed when changing the type of plate to be used in a printing press. While maintaining this advantage, a solution is provided which is environmentally friendly with substantially decreased alcohol content and, in which, ethylene glycol can be decreased or eliminated.

The formulation method of the newly adaptable fountain solution is based upon an aqueous stock solution with about 1 to 25% by weight buffer selected from the group comprising monopotassium phosphate, monosodium phosphate, monoammonium phosphate, monopotassium citrate; with about 1 to about 30% by weight humectant, in which the use of ethylene glycol is decreased or eliminated by selecting, preferably, from the group comprising glycerin, propylene glycol or sorbitol; with about 1 to 15% of an emulsifing and coupling agent such as ethylene glycol monobutyl ether; with an amine selected from the group comprising N-methylpyrrolodine, triethylamine and trimethylamine and in which the amine is selected in combination with an alcohol so as to substantially decrease the alcohol content and in which the combined amine and alcohol can comprise about 1% to about 25% of the solution with the amine being selected in the range of about 1% to about 24% by weight of the solution. A trace amount (about 0.2 to about 0.5% by weight) of phosphoric, lactic or citric acid can be added to stabilize the pH for operations within a range of 2 to 7; with the range for the stock solution preferably being about 3.5 to about 4.5. Inert food coloring can be added subject to marketing preferences; such as, combining Alkali Fast Green and Tartrazine Yellow to provide a desired color to signify a fountain solution of decreased alcohol content. A desensitizing agent, such as gum arabic, can be added at about 0.1 to 4% by weight of the solution, and the balance water.

In the following embodiment, each constituent is set forth in terms of percent by weight of the total stock solution:

EXAMPLE I

| | |
|---|---|
| Buffer | 5% |
| Amine | 15% |
| Alcohol | 5% |
| Glycerin | 5% |
| Ethylene glycol | 1% |
| Ethylene glycol monobutyl ether, | 6% |
| balance—water. | |

In preparing fountain solution of the invention, it is preferred that the selected buffer be first added to the water and thoroughly mixed. Water refers to distilled or deionized water, or to purified water of sufficiently decreased electrolyte content so as not to interfere with printing. After mixing the buffer and water, the remaining liquid ingredients are selected, added and thoroughly mixed. The solution of Example I constitutes a stock solution which is diluted prior to operating use in a press; a ratio of one part stock solution to about seven to ten parts water can be used for printing operations.

Example II provides a specific formulation; all percentages are by weight:

| EXAMPLE II | |
|---|---|
| Monopotassium phospate | about 2% |
| Combined Amine and Alcohol with alcohol comprising about 3% | about 7.5% |
| Glycerin | about 12% |
| Ethyl glycol monobutyl ether, | about 8% |
| balance—water. | |

The following solution is adapted to provide a higher percent of alcohol, to eliminate ethylene glycol, and add gum arabic as a desensitizing agent; all percentages are by weight:

| EXAMPLE III | |
|---|---|
| Buffer | about 12% |
| Combined Amine and Alcohol, with alcohol comprising about 10% | about 25% |
| Humectant | about 15% |
| Gum arabic | about .1% to about 4% |
| Emulsifying and coupling agent: (such as) ethylene glycol monobutyl ether, | about 10% |
| balance—water. | |

Fountain solutions adaptable to existing equipment and materials can be formulated in the following ranges by weight:

| Constituent | Percent Range |
|---|---|
| Buffer: monopotassium phosphate, monosodium phosphate, monoammonium phosphate, monopotassium citrate, or mixtures thereof | 1-25% |
| Amine, in combination with alcohol Amine selected from: N-methylpyrrolidine, triethylamine, or trimethylamine; Alcohol, selected from: isopropyl alcohol, ethyl alcohol, or N-propyl alcohol, or mixtures thereof | 1-25% |
| Humectant: preferably glycerin, sorbitol, propylene glycol, or mixtures thereof, with ethylene glycol eliminated or decreased to less than 10% | about 2-30% |
| Emulsifying and coupling agent: Ethylene glycol monobutyl ether or propylene glycol butyl ether. | about 2-12% |
| Balance—water | |

About 0.1 to about 4% by weight desensitizing agent, such as gum arabic, can be added; inert food coloring can be added to colorize the solution to preference.

Preferably, the alcohol content is kept below about 12.5%, dependent on the equipment and materials. The sum of the amine with curtailed alcohol content is selected so as not to exceed a total of about 25% by weight of the stock solution; a sixty-forty ratio of amine to alcohol with a combined total of about 7.5% by weight is a specific example. And, ethylene glycol is, preferably, eliminated or curtailed to less than about 5%.

The transitional solutions of the present invention enable the percentage alcohol content by weight of the solution to be decreased while accommodating existent equipment or materials and while maintaining desired printing characteristics through use of lower flash point amines in combination with alcohol.

The overall range of alcohol contents is significantly decreased, preferably to less than 12.5%, without disturbing desired printing characteristics with inks established for use on existing printing presses.

A preferred range of dilution of the stock solution with water is set forth above; however, it has been found that acceptable operating fountain solutions can extend the range of dilution to one part stock solution to about twenty-five parts water.

The foregoing teachings facilitate compliance of printing operations with varying regulations expected in differing jurisdictions by enabling adjustment of the alcohol content while accommodating present equipment and environmentally preferred ink.

It should be recognized, however, that variations from specified embodiments can be made by those skilled in the art in light of the above teachings; therefore, in determining the scope of the present invention, reference shall be made to the appended claims.

What is claimed is:

1. A stock fountain solution for use in planographic printing, comprising:

a buffer, a humectant, an emulsifying and coupling agent, and an alcohol and an amine in combination, wherein the amine in such combination is present in an effective amount so as to enable a substantial decrease in percentage of alcohol content.

2. The solution of claim 1, in which the combined alcohol and amine percentage by weight of the solution is about 25%, and in which amine content comprises a percentage in the range of about 1% to less than about 24% by weight of the solution while maintaining such combined percentage of about 25% with alcohol in order to provide for continued printing operations with existing printing equipment and materials.

3. The solution of claim 1, wherein the humectant is selected from the group consisting of propylene glycol, glycerin, ethylene glycol and sorbitol.

4. The solution of claim 1, wherein the buffer is selected from the group consisting of monopotassium phosphate, monosodium phosphate, monoammonium phosphate, and monopotassium citrate.

5. The solution of claim 4, wherein an acid, selected from the group consisting of phosphoric, lactic and citric acid, is added at about 0.2% to about 0.5% by weight of the solution for purposes of stabilizing the pH of the solution.

6. The solution of claim 4, wherein the emulsifying and coupling agent is selected from the group consisting of ethylene glycol monobutyl ether and propylene glycol butyl ether.

7. The solution of claim 6, further including a desensitizing agent in the amount of about 0.1% to about 4% by weight of the solution.

8. The solution of claim 7, in which the desensitizing agent is gum arabic.

9. The solution of claim 6, in which the combined amine and alcohol percentage by weight of the solution is about 7.5%, and in which the amine comprises about 60% of the combined amine and alcohol.

10. Method for curtailing use of alcohol in preparing a stock fountain solution for use with existing planographic printing equipment and printing materials, comprising:

mixing a buffer with water, adding a humectant, adding an emulsifying and coupling agent, and adding an amine in combination with an alcohol wherein the amine is present in an effective amount so as to enable substantially decreasing alcohol requirements for purposes of continued use of such existing planographic printing equipment and printing materials.

11. The method of claim 10, wherein the amine and alcohol combination is added to comprise about 25% by weight of the solution, and in which the alcohol content is decreased to less than 24% by weight of the solution.

12. The method of claim 10, wherein the alcohol is decreased to less than about 12.5% by weight of the solution.

13. The method of claim 10, wherein the amine and alcohol combination is added to comprise about 7.5% by weight of the solution with alcohol content comprising about 60% by weight of combination, and further including adding a desensitizing agent in the amount of about 0.1% to about 4% by weight of the solution.

14. The method of claim 13, further including adding an inert food coloring to colorize the solution to preference.

15. The method of claim 10, in which the humectant is added in the amount of about 2% to about 30% by weight of the solution, and the humectant is selected from the group consisting of propylene glycol, glycerin, ethylene glycol, sorbitol and combinations thereof.

16. The method of claim 15, wherein any use of ethylene glycol is limited to an amount of less than about 5% by weight of the solution.

17. The method of claim 10, including selecting the emulsifying and coupling agent from the group consisting of ethylene glycol monobutyl ether and propylene glycol butyl ether, and adding such emulsifying and coupling agent in the range of about 1% to about 15% by weight of the solution.

18. The method of claim 10, in which adding of the amine is carried out by selecting the amine for adding to the solution from the group consisting of N-methylpyrrolidine, trimethylamine, and triethylamine.

* * * * *